(12) United States Patent
Okanaka et al.

(10) Patent No.: US 9,145,046 B2
(45) Date of Patent: Sep. 29, 2015

(54) VIBRATION DAMPING DEVICE

(71) Applicant: SUMITOMO RIKO COMPANY LIMITED, Komaki-shi, Aichi (JP)

(72) Inventors: Takehiro Okanaka, Kasugai (JP); Satoki Koga, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 0 days.

(21) Appl. No.: 14/604,203

(22) Filed: Jan. 23, 2015

(65) Prior Publication Data

US 2015/0129742 A1    May 14, 2015

Related U.S. Application Data

(63) Continuation of application No. PCT/JP2013/075551, filed on Sep. 20, 2013.

(30) Foreign Application Priority Data

Sep. 26, 2012 (JP) ................................. 2012-213140

(51) Int. Cl.
*F16M 13/00* (2006.01)
*B60K 5/12* (2006.01)
(Continued)

(52) U.S. Cl.
CPC .............. *B60K 5/1208* (2013.01); *F16F 1/3842* (2013.01); *F16F 1/3863* (2013.01); *F16F 15/08* (2013.01)

(58) Field of Classification Search
CPC ...... B60K 5/1208; F16F 15/08; F16F 1/3842; F16F 1/3863

USPC .............. 248/632, 634, 635, 638; 267/140.4, 267/140.11, 140.13
See application file for complete search history.

(56) References Cited

U.S. PATENT DOCUMENTS

| | | | |
|---|---|---|---|
| 2005/0179181 A1* | 8/2005 | Okanaka et al. ......... | 267/140.12 |
| 2006/0043656 A1* | 3/2006 | Shimizu ................... | 267/140.11 |
| 2009/0174126 A1* | 7/2009 | Takeshima et al. ....... | 267/140.4 |

FOREIGN PATENT DOCUMENTS

| | | |
|---|---|---|
| JP | 2005-265179 A | 9/2005 |
| JP | 2008-132846 A | 6/2008 |

(Continued)

OTHER PUBLICATIONS

Apr. 9, 2015 International Preliminary Report on Patentability issued in International Application No. PCT/JP2013/075551.
(Continued)

*Primary Examiner* — Gwendolyn W. Baxter
(74) *Attorney, Agent, or Firm* — Oliff PLC

(57) ABSTRACT

A vibration damping device including: first and second mounting members; a main rubber elastic body elastically connecting the two members; and a bracket member fit into the first mounting member. A projecting part projects outward from a circumference of the first mounting member, and includes a locking groove whose inner surface is covered by a rubber coating layer and has a locking part on its side wall inner surface. An engaging projection projecting from the bracket member is fit into the locking groove, and a projection tip surface of the engaging projection is abutted on a bottom wall inner surface of the locking groove. A side surface of the engaging projection is locked to the locking part so as to constitute a positioning member that positions the first mounting member and the bracket member to each other.

5 Claims, 7 Drawing Sheets

(51) Int. Cl.
    *F16F 1/38* (2006.01)
    *F16F 15/08* (2006.01)

(56) References Cited

FOREIGN PATENT DOCUMENTS

| JP | 2009-041760 A | 2/2009 |
| JP | 2012-036971 A | 2/2012 |
| JP | 2012-036972 A | 2/2012 |

OTHER PUBLICATIONS

Dec. 24, 2013 International Search Report issued in International Patent Application No. PCT/JP2013/075551.

\* cited by examiner

VIBRATION DAMPING DEVICE

INCORPORATED BY REFERENCE

The disclosure of Japanese Patent Application No. 2012-213140 filed on Sep. 26, 2012, including the specification, drawings and abstract is incorporated herein by reference in its entirety. This is a Continuation of International Application No. PCT/JP2013/075551 filed on Sep. 20, 2013.

BACKGROUND OF THE INVENTION

1. Field of the Invention

The present invention relates to a vibration damping device used for an engine mount of an automobile or the like, and particularly relates to a vibration damping device for which a bracket member is fit and mounted in a tube shaped first mounting member.

2. Description of the Related Art

From the past, known are vibration damping devices interposed between members constituting the vibration transmission system as one type of vibration damping connecting body or vibration damping support body for vibration damping connecting those members to each other. The vibration damping device has a first mounting member attached to one member constituting the vibration transmission system, and a second mounting member attached to the other member constituting the vibration transmission system, and these are elastically connected by a main rubber elastic body. Also, as the vibration damping device, as shown in Japanese Unexamined Patent Publication No. JP-A-2012-036971, proposed is a constitution for which the first mounting member has a tube shape, and a bracket member is fit and mounted in the inner hole of the first mounting member, and the first mounting member is made to be attached to the member constituting the vibration transmission system via the bracket member.

However, with the vibration damping device having this kind of constitution for which the bracket member is fit into and attached to a tube shaped first mounting member, it is easy to have the problem of the bracket member falling out from the first mounting member. In light of that, with JP-A-2012-036971, by a concave shaped or convex shaped engaging part being provided on a rubber coating layer that covers the inner circumference surface of the first mounting member, and also a convex shaped or concave shaped engaging part being provided on the outer circumference surface of the bracket member, it is easier to keep the connected state of the bracket member to the first mounting member.

However, when using the constitution noted in JP-A-2012-036971, while the first mounting member and bracket member positioning effect by the locking action can be expected, there is the problem that the positioning effect is decreased due to fitting of the bracket member to the first mounting member. Specifically, when the bracket member is fit into the first mounting member, by having the outer surface of the bracket member push against the inner surface of the first mounting member, a positioning effect by fitting is exhibited, and falling out of the bracket member from the first mounting member is prevented. However, one of the engaged part and the engaging part is made to be put into the other and locked, and with the part formed by the engaged part and the engaging part, as described above, since there is a decrease in the positioning effect by the fitting, there was the risk of not having a sufficient positioning effect to prevent the bracket member from falling out of the first mounting member.

SUMMARY OF THE INVENTION

The present invention was created with the circumstances described above in the background, and the problem it is to solve is to provide a vibration damping device of a novel structure, which is able to more effectively position the first mounting member and the bracket member while effectively obtaining a positioning effect by fitting of the first mounting member and the bracket member.

A first mode of the present invention is a vibration damping device comprising: a tubular first mounting member having an inner hole used as a fitting hole covered by a rubber coating layer; a second mounting member; a main rubber elastic body elastically connecting the first and second mounting members; and a bracket member fit into the fitting hole of the first mounting member, wherein a projecting part is formed partially on a circumference of the first mounting member so as to project toward an outer circumference side, a locking groove is formed on the projecting part so as to open onto an inner circumference surface of the first mounting member, and a groove inner surface of the locking groove is covered by the rubber coating layer, a locking part is provided on a part of the rubber coating layer that constitutes a side wall inner surface of the locking groove, an engaging projection projecting from the bracket member is fit into the locking groove by the bracket member being fit into the first mounting member, and a projection tip surface of the engaging projection is abutted on a bottom wall inner surface of the locking groove, and a side surface of the engaging projection is locked to the locking part so as to constitute a positioning member that positions the first mounting member and the bracket member to each other.

With this kind of vibration damping device constituted according to the first mode, by the side surface of the bracket member being locked to the locking part provided on the inner circumference surface of the first mounting member, the falling out of the bracket member from the fitting hole is prevented, and the bracket member is positioned with the first mounting member.

Furthermore, a projecting part that projects to the outer circumference side and a locking groove that opens to the inner circumference side formed on that projecting part are provided on the first mounting member, and the locking part is formed on a rubber coating layer that covers the inner surface of the side wall of the locking groove. In fact, the projection tip surface of the engaging projection part of the bracket member is abutted on the bottom wall inner surface of the locking groove, and even with the engaging projection and the locking groove formed part, the bracket member is sandwiched and supported by the first mounting member in the engaging projection and the projecting part projection direction. By so doing, there is sufficient assurance that the pressed surface area of inner circumference surface of the fitting hole and the bracket member will not become smaller due to formation of the locking part, and a positioning effect due to fitting between the first mounting member and the bracket member is effectively exhibited.

With the projecting part, preferably, the projection direction suitably roughly matches one of the main vibration input directions with the vibration damping device. By so doing, a load input surface is ensured to be large by the projection tip surface of the engaging projection abutting the bottom wall inner surface of the locking groove, and the positioning member is constituted by the locking part at the side wall inner surface of the locking groove for which the input load is relatively small. Because of this, the vibration damping effect on the input vibration which is the target is effectively exhibited, a decrease in the positioning effect due to deformation of the locking part is prevented, and the first mounting member and the bracket member are positioned in a stable connected state.

A second mode of the present invention provides the vibration damping device according to the first mode, wherein the locking part comprises an abutting step part provided at a medial section in a groove length direction of the part of the rubber coating layer that constitutes the side wall inner surface of the locking groove so as to provide a wide groove part on a first side of the abutting step part of the locking groove covered by the rubber coating layer as well as a narrow groove part on a second side of the abutting step part whose width dimension is smaller than that of the wide groove part, the first side and the second side are opposed to each other with the abutting step part interposed therebetween, an abutted step part is provided on the side surface of the engaging projection at a medial section in a length direction thereof so as to provide a wide part on a first side of the abutted step part of the engaging projection as well as a narrow part on a second side of the abutted step part whose width dimension is smaller than that of the wide part, the first side and the second side are opposed to each other with the abutted step part interposed therebetween, and the engaging projection is fit into the locking groove from a narrow groove part side with a wide part side as a front, and the positioning member is constituted by the abutting step part and the abutted step part being abutted and locked.

With the second mode, by the abutting step part and the abutted step part being abutted and locked in the axis direction of the first mounting member, the positioning member of the first mounting member and the bracket member is constituted. Therefore, for the bracket member in relation to the first mounting member, by the wide part being sufficiently pushed in until it passes the abutting step part of the locking group and then pulled back, the abutting step part and the abutted step part are reliably locked, and it is possible to easily position the first mounting member and the bracket member to a designated location.

A third mode of the present invention provides the vibration damping device according to the second mode, wherein a side wall inner surface of the narrow groove part of the locking groove includes a guide surface that gradually becomes narrower toward the abutting step part.

With the third mode, by providing the guide surface, the work of fitting in the engaging projection to the locking groove is easier. In particular, if the end part of the side opposite to the abutting step part of the guide surface is made to be a dimension of a larger width than that of the wide part of the engaging projection, when fitting in the engaging projection to the locking groove, it is possible to prevent the engaging projection from catching on the end surface of the rubber coating layer, and to make the fitting work easier.

A fourth mode of the present invention provides the vibration damping device according to the second or third mode, wherein the engaging projection includes a fitted tip part that is provided further to a front side than the wide part and has a width dimension smaller than that of the wide part, and the wide part and the fitted tip part are continuously provided via a taper part whose width dimension gradually changes.

With the fourth mode, by the fitted tip part being provided on the engaging projection, the work of fitting in the engaging projection to the locking groove is easier. In fact, since the wide part and the fitted tip part are connected by the taper part, the boundary part of the wide part and the fitted tip part are prevented from catching on the locking groove. In particular, if combined with the kind of locking groove guide surface noted above, it is possible to more easily fit the engaging projection into the locking groove.

A fifth mode of the present invention provides the vibration damping device according to any one of the first through fourth modes, wherein the projecting part projects in a direction of opposition of the first mounting member and the second mounting member, and a stopper that limits relative displacement volume of the first mounting member and the second mounting member is constituted by abutment of a projecting tip of the projecting part and the second mounting member.

With the fifth mode, the projecting part of the first mounting member constitutes the stopper, and by the projection tip of the projecting part abutting the second mounting member, the relative displacement volume of the first mounting member to the second mounting member is limited, so there is an improvement in the durability with a simple structure with a small parts count. In fact, since the engaging projection of the bracket member is fit into the locking groove of the projecting part, the projecting tip of the engaging projection is abutted on the bottom wall inner surface of the locking groove, so the load bearing ability of the stopper is sufficiently assured, and problems such as deformation of the projecting part and the like are avoided.

Furthermore, with this kind of structure by which the projecting part constitutes the stopper, the direction of projection of the projecting part is set to roughly match the main load input direction, so load transmission efficiency between the first mounting member and the bracket member is ensured, and the locking structure retained by the locking part is realized stably.

With the present invention, a projecting part equipped with a locking groove is provided with the first mounting member, the engaging projection of the bracket member is fit into the locking groove, and the projection tip surface of the engaging projection is abutted on the bottom wall inner surface of the locking groove, and the side surface of the engaging projection is locked to the locking part provided on the side wall inner surface of the locking groove to constitute the positioning member. By so doing, the first mounting member and the bracket member are positioned based on the locking effect exhibited by the positioning member, and by the pressed surface area of the inner circumference surface of the first mounting member and the outer circumference surface of the bracket member being sufficiently ensured, it is also possible to obtain an effective positioning effect.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
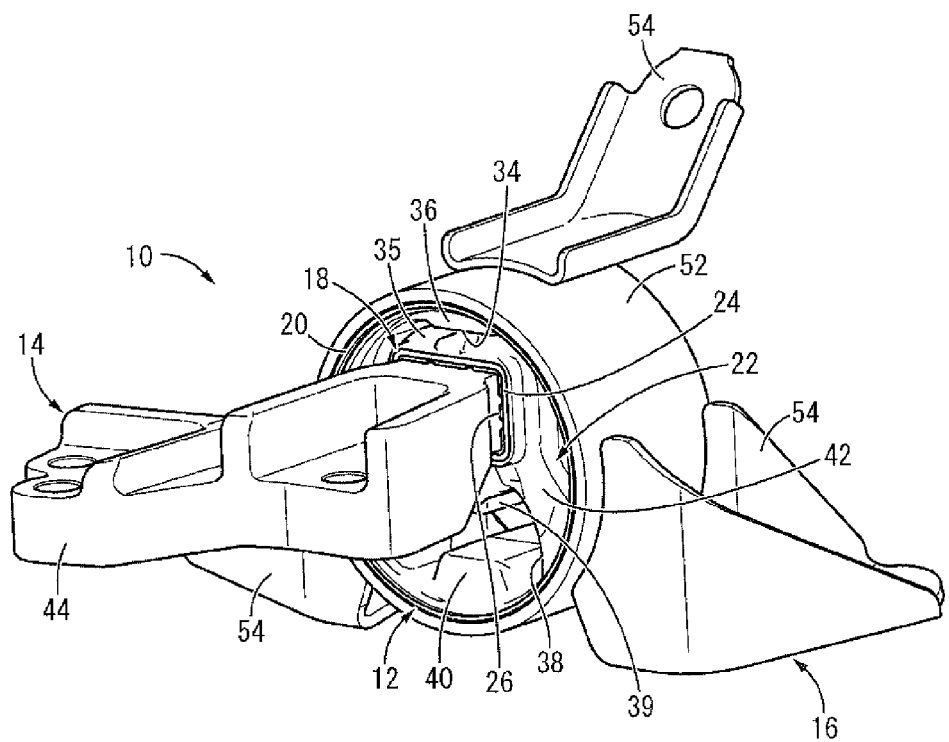
FIG. 1 is a perspective view showing a vibration damping device in the form of an engine mount as a first embodiment of the present invention.

Following, we will describe an embodiment of the present invention while referring to the drawings.

FIG. 1 shows an engine mount 10 of an automobile as a first embodiment of a vibration damping device constituted according to the present invention. This engine mount 10 is constituted with an inner bracket 14 as a bracket member and an outer bracket 16 attached to a mount main body 12. Then, the inner bracket 14 is attached to a power unit (not illustrated), and the outer bracket 16 is attached to a vehicle body (not illustrated), and the power unit is connected with vibration damping to the vehicle body via the engine mount 10. With the description hereafter, the vertical direction as a rule means the vertical direction in FIG. 3 which is the main vibration input direction.

Figure 2:
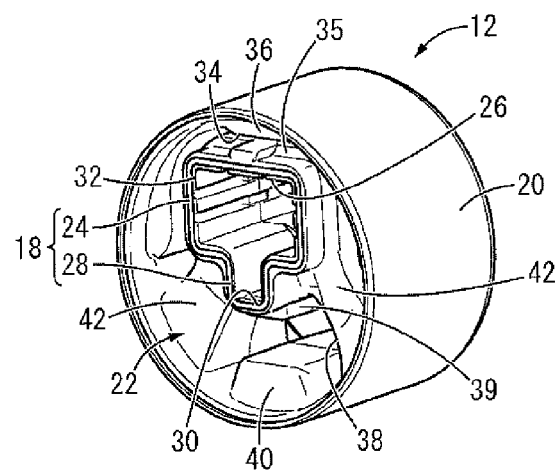
FIG. 2 is a perspective view of a mount main body constituting the engine mount shown in FIG. 1.
Figure 3:
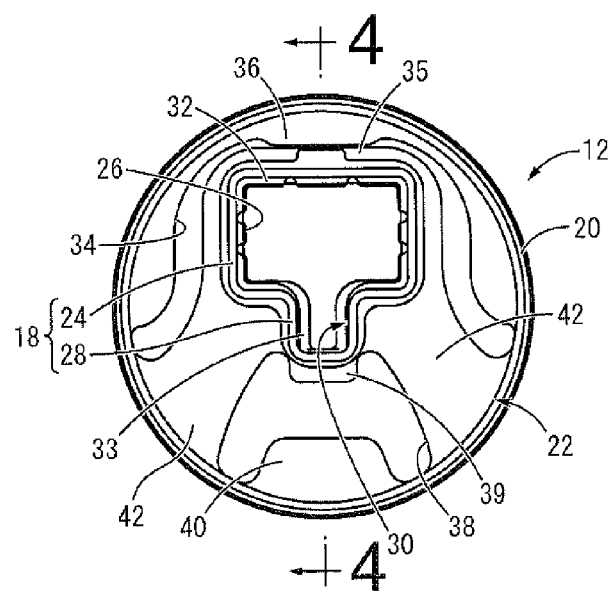
FIG. 3 is a front view of the mount main body shown in FIG. 2.
Figure 4:
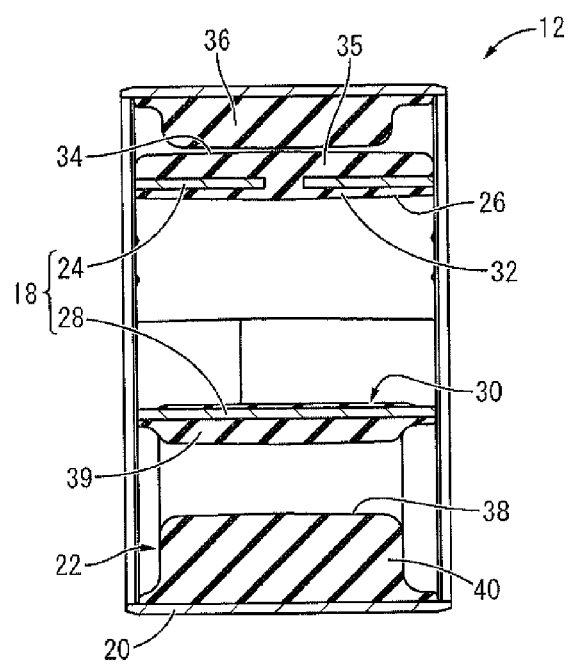
FIG. 4 is a cross section view taken along line 4-4 of FIG. 3.

In more detail, as shown in FIG. 2 to FIG. 4, the mount main body 12 has a structure for which a first mounting member 18 and a second mounting member 20 are elastically connected by a main rubber elastic body 22.

Figure 5:
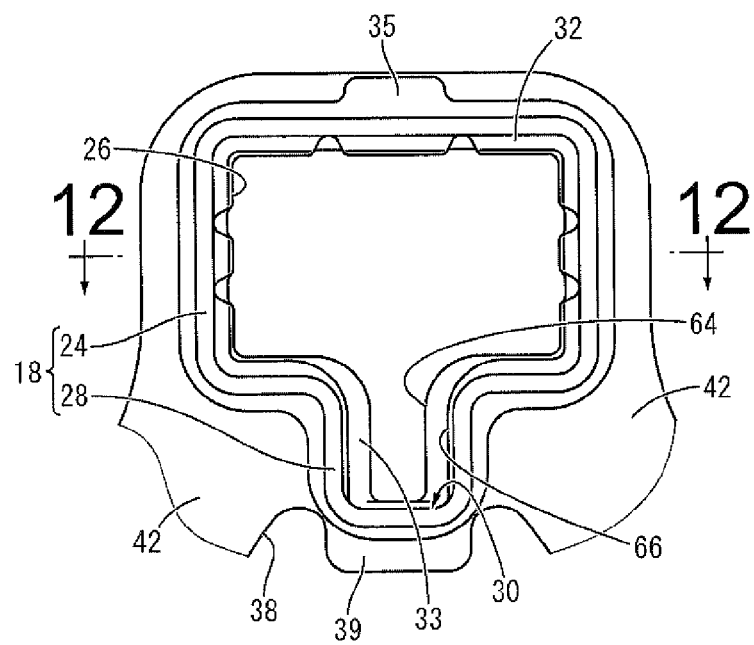
FIG. 5 is an enlarged front view of a principle part of the mount main body shown in FIG. 2.
Figure 6:
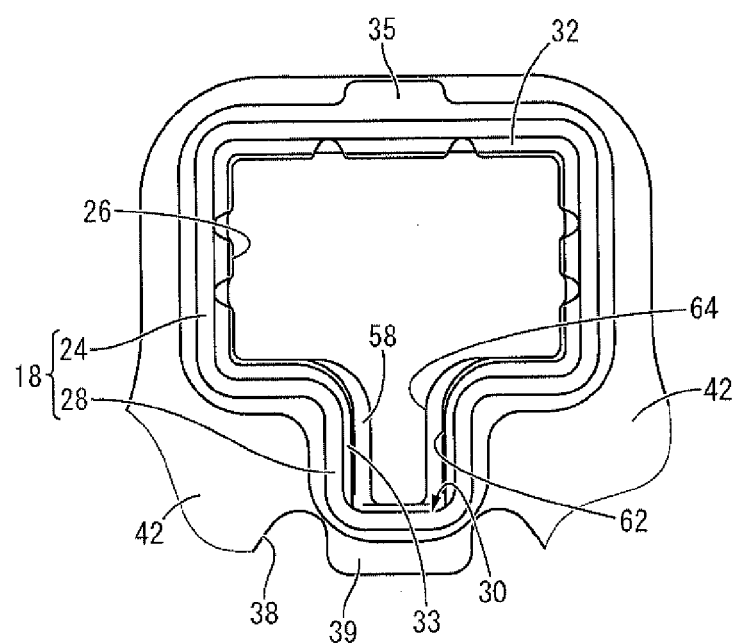
FIG. 6 is an enlarged rear view of a principle part of the mount main body shown in FIG. 2.
Figure 7:
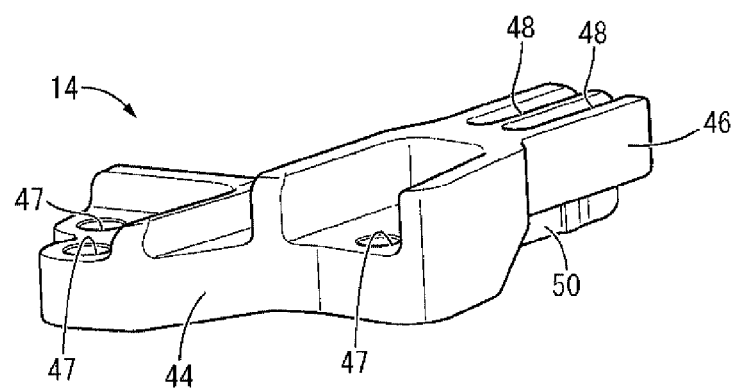
FIG. 7 is a perspective view of an inner bracket constituting the engine mount shown in FIG. 1.
Figure 8:
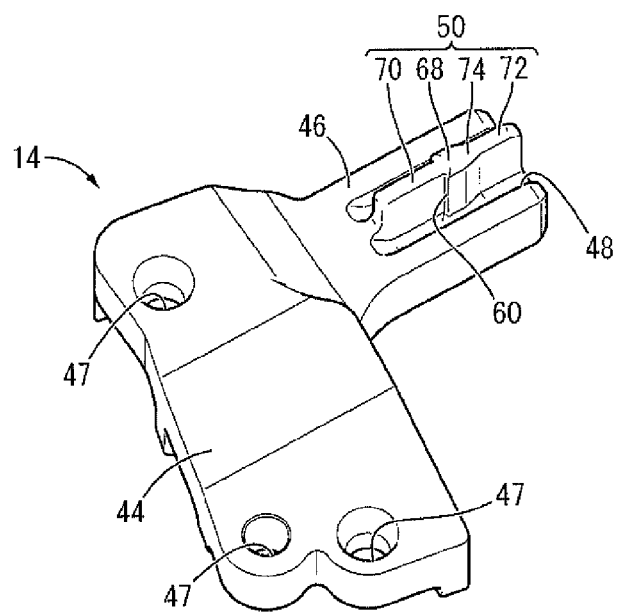
FIG. 8 is a perspective view of the inner bracket shown in FIG. 7 from a different angle.
Figure 9:
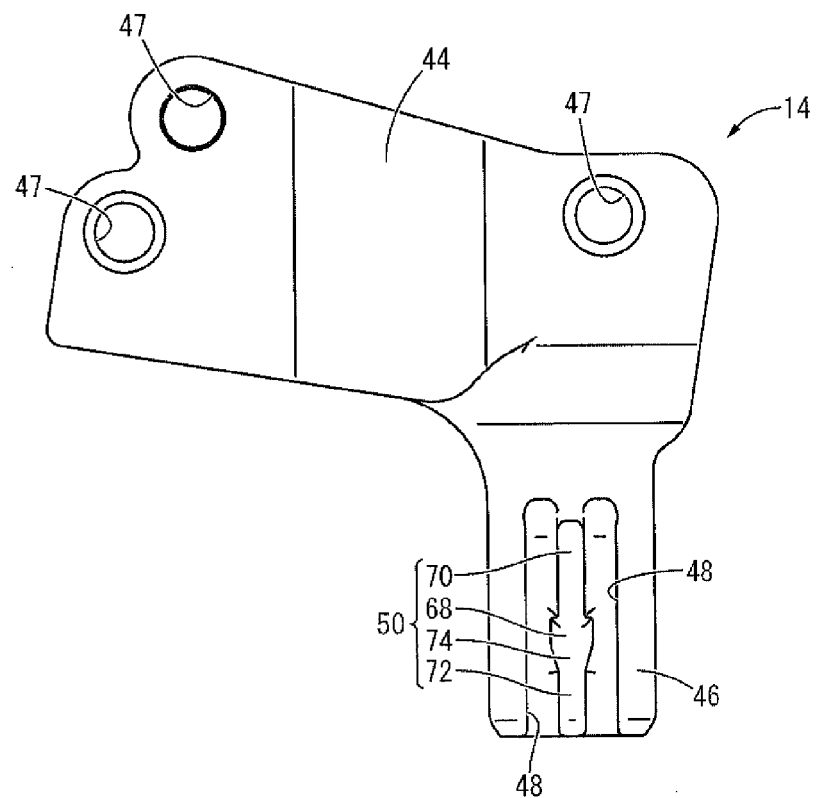
FIG. 9 is a bottom view of the inner bracket shown in FIG. 7.
Figure 10:
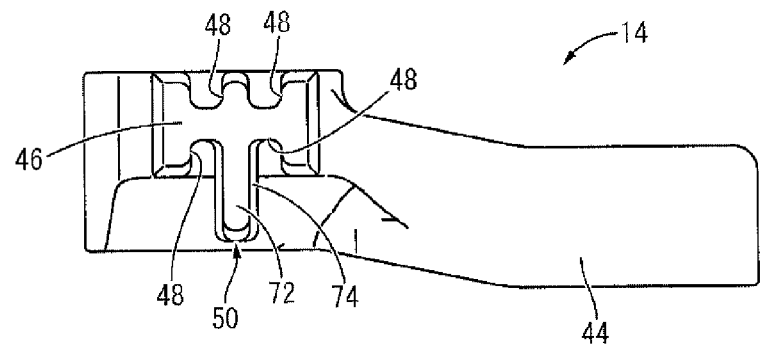
FIG. 10 is a rear view of the inner bracket shown in FIG. 7.

The first mounting member 18 is a highly rigid member formed using iron, aluminum alloy or the like, and as shown in FIG. 5 and FIG. 6, is a tubular member equipped with a fitting tube 24 having a roughly square tube shape for which the corners are rounded to an arc shape, and the inner hole of the fitting tube 24 is a fitting hole 26 that extends in roughly a fixed cross section shape. Furthermore, a projecting part 28 is integrally formed with the fitting tube 24, and projects toward the outer circumference side (here, downward which is the main vibration input direction) at the circumferentially center part of the lower side part of the fitting tube 24. On this projecting part 28 is formed a locking groove 30 that opens upward and also extends across the entire length of the axis direction of the first mounting member 18, and its groove interior area is in communication with the fitting hole 26. As described later, the inner circumference surface of the first mounting member 18 is covered by a rubber coating layer 32, and the wall inner surface of the fitting hole 26 and the locking groove 30 is constituted with a rubber coating layer 32.

The second mounting member 20 exhibits a thin walled, large diameter, roughly cylindrical shape, and is a highly rigid member, the same as the first mounting member 18. Also, the first mounting member 18 is fit into and arranged on the inner circumference side of the second mounting member 20, and the first mounting member 18 and the second mounting member 20 are elastically connected by the main rubber elastic body 22. Also, the rubber coating layer 32 which is integrally formed with the main rubber elastic body 22 covers the inner circumference surface of the first mounting member 18. The inner circumference surface of the first mounting member 18 has not only the inner circumference surface of the fitting tube 24, but also the groove inner surface of the locking groove 30 covered by the rubber coating layer 32 across roughly the entire surface, and in particular, the side wall inner surface of the locking groove 30 is constituted by a side wall rubber coating 33 which is a part of the rubber coating layer 32. Also, on the rubber coating layer 32, at the part that covers each wall inner surface of the top wall part and the pair of side wall parts of the fitting tube 24 are formed two groove parts each, and during fitting of the inner bracket 14 into the fitting hole 26, escaping is allowed to the groove part of the rubber coating layer 32.

Furthermore, a first bore part 34 is formed piercing in the axis direction in the main rubber elastic body 22. This first bore part 34 extends across about half the circumference above the first mounting member 18, and both end parts of this reach the inner circumference surface of the second mounting member 20. Also, between the top surface of the first mounting member 18 and the inner circumference surface of the second mounting member 20, a first stopper rubber 35 fixed to the first mounting member 18 and a second stopper rubber 36 fixed to the second mounting member 20 are integrally formed with the main rubber elastic body 22, and are arranged vertically opposite sandwiching the first bore part 34. Also, by the first mounting member 18 and the second mounting member 20 abutting via the first and second stopper rubbers 35 and 36, a rebound stopper that restricts the relative displacement volume upward of the first mounting member 18 in relation to the second mounting member 20 is constituted.

Furthermore, a second bore part 38 is formed piercing in the axis direction on the main rubber elastic body 22. The second bore part 38 is provided below the first mounting member 18, and has a roughly trapezoid cross section for which the circumferential length becomes longer as it goes to the outer circumference side. Also, a third stopper rubber 39 projecting from the bottom wall part of the locking groove 30 of the first mounting member 18 and a fourth stopper rubber 40 projecting from the second mounting member 20 both project at the circumferentially center part on the second bore part 38 and are arranged vertically opposite at a given distance. Then, by the first mounting member 18 and the second mounting member 20 abutting via the third and fourth stopper rubbers 39 and 40, a bound stopper is constituted as a stopper for restricting the relative displacement upward of the first mounting member 18 in relation to the second mounting member 20.

With this embodiment, the projecting part 28 of the first mounting member 18 projects toward the second mounting member 20, and between the projecting tip of the projecting part 28 and the second mounting member 20 are arranged the second bore part 38, and the third and fourth stopper rubbers 39 and 40. Accordingly, a bound stopper is constituted by abutment of the projecting tip of the projecting part 28 and the second mounting member 20 via the third and fourth stopper rubbers 39 and 40. By so doing, special parts for constituting the bound stopper are unnecessary, and it is possible to obtain a bound stopper using a simple structure with a small number of parts. In fact, by adjusting the projection dimension of the projecting part 28, it is also possible to freely set the stopper clearance.

By the first bore part 34 and the second bore part 38 being formed, the first mounting member 18 and the second mounting member 20 are elastically connected to each other by a pair of rubber arms 42, 42 provided between the circumference direction of the first bore part 34 and the second bore part 38.

On the mount main body 12 constituted in this way, the inner bracket 14 is attached to the first mounting member 18, and the outer bracket 16 is attached to the second mounting member 20.

As shown in FIG. 7 through FIG. 10, the inner bracket 14 is a highly rigid member formed of iron or aluminum alloy or the like, or fiber reinforced synthetic resin or the like, and has a structure for which an attachment part 44 configured to attach to the power unit and a fitting part 46 configured to attach to the first mounting member 18 are integrally formed. On the attachment part 44, a plurality of attachment bolt holes 47 are formed piercing vertically. Also, on the fitting part 46, two concave grooves 48 each are formed at both top and bottom surfaces, and extending in the direction of projection of the fitting part 46 from the attachment part 44, it is possible to easily perform fitting of the fitting part 46 into the first mounting member 18 described later with little force.

Furthermore, an engaging projection 50 is integrally formed with the fitting part 46 of the inner bracket 14. As shown in FIG. 7 to FIG. 10, the engaging projection 50 projects downward from the fitting part 46, and is a protrusion continuing at a designated length along the direction of projection of the fitting part 46 from the attachment part 44. The engaging projection 50 is provided between two concave grooves 48, 48 formed opening at the bottom surface of the fitting part 46.

Figure 11:
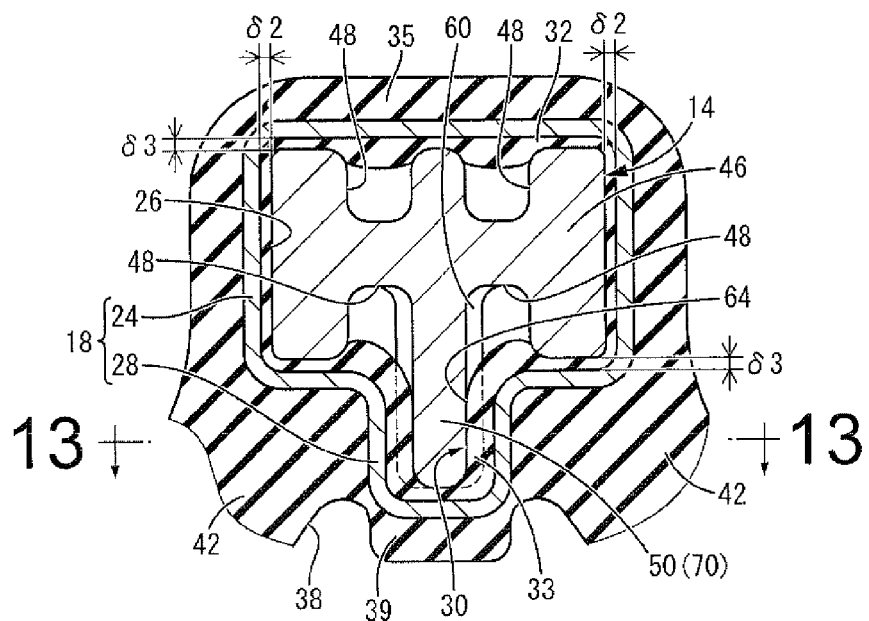
FIG. 11 is an enlarged longitudinal cross section view showing a principle part of the engine mount shown in FIG. 1, taken along line 11-11 of FIG. 13.

Then, as shown in FIG. 11, by the fitting part 46 being fit into the fitting hole 26 of the first mounting member 18, and the engaging projection 50 being fit into the locking groove 30, the inner bracket 14 is fixed to the first mounting member 18. By this attachment part 44 of the inner bracket 14 being fixed to the power unit by bolts that are inserted through the attachment bolt holes 47, the first mounting member 18 is made to be attached to the power unit via the inner bracket 14.

In the state with the inner bracket 14 mounted to the first mounting member 18, the rubber coating layer 32 that covers the inner surface of the fitting hole 26 is compressed vertically between the fitting tube 24 and the fitting part 46, and the fitting tube 24 and the fitting part 46 are pressed against each other at a designated surface pressure. Furthermore, the rubber coating layer 32 that covers the bottom wall inner surface of the locking groove 30 is compressed vertically between the bottom wall inner surface of the locking groove 30 and the projection tip surface of the engaging projection 50, and the projection tip surface of the engaging projection 50 is pressed against the bottom wall inner surface of the locking groove 30 at a designated surface pressure.

Meanwhile, the outer bracket 16 has a constitution for which there is a tubular main body 52 having a thin walled, large diameter, roughly cylindrical shape with three attachment plates 54 fixed on the circumference of the tubular main body 52. The three attachment plates 54 area all groove shapes with high rigidity.

Then, by the second mounting member 20 being pressure fit to the tubular main body 52 of the outer bracket 16, the outer bracket 16 is externally fit and fixed to the second mounting member 20. By the attachment plate 54 of this outer bracket 16 being fixed by a bolt to the vehicle body, the second mounting member 20 is made to be attached to the vehicle body via the outer bracket 16. By so doing, the engine mount 10 is interposed between the power unit and the vehicle body, and the power unit is made to be connected with vibration damping to the vehicle body.

Here, the positioning member that relatively positions the first mounting member 18 and the inner bracket 14 is provided on the engine mount 10, and falling out of the inner bracket 14 from the first mounting member 18 is prevented.

Specifically, an abutting step part 58 is provided as a locking part on the side wall rubber coating 33 of the rubber coating layer 32, and an abutted step part 60 is provided at both side surfaces of the engaging projection 50 of the inner bracket 14, and the positioning member is constituted by the abutting step part 58 and the abutted step part 60 being abutted and locked.

Figure 12:
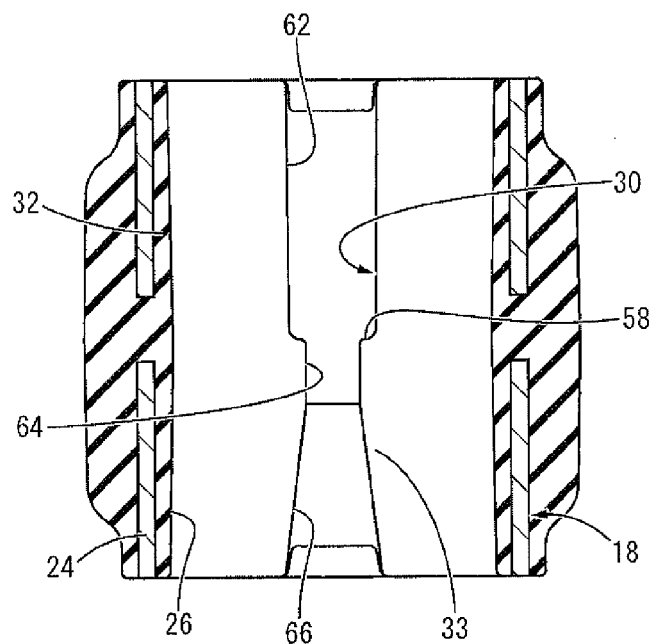
FIG. 12 is an enlarged transverse cross section view showing a principle part of the mount main body shown in FIG. 2, taken along line 12-12 of FIG. 5.

In more specific terms, as shown in FIG. 12, on the side wall rubber coating 33, the abutting step part 58 is provided at a medial section in the length direction of the locking groove 30. The first side of the abutting step part 58 of the locking groove 30 (in FIG. 12, the top side) serves as a wide groove part 62, while the second side of the abutting step part 58 (in FIG. 12, the bottom side) serves as a narrow groove part 64 whose width dimension is narrower than that of the wide groove part 62, the first side and the second side being opposed to each other with the abutting step part 58 interposed therebetween. In other words, on the locking groove 30 are provided serially and continuously the wide groove part 62 and the narrow groove part 64 whose width dimension is narrower than that of the wide groove part 62, and the abutting step part 58 is formed at the connection part of the wide groove part 62 and the narrow groove part 64. Furthermore, the side wall inner surfaces of the narrow groove part 64 are constituted with a taper shaped guide surface 66 that gradually becomes narrower from the outside edge part in the length direction toward the abutting step part 58. With this guide surface 66, the end part of the wide side has a width dimension that is roughly the same as that of the wide groove part 62, and has a width dimension greater than that of a fitted tip part 72 of the inner bracket 14 described later. The projecting part 28 of the first mounting member 18 is formed with roughly a fixed cross section shape, and the changes in width dimension of the locking groove 30 are all realized by changes in the thickness dimension of the side wall rubber coating 33.

Figure 13:
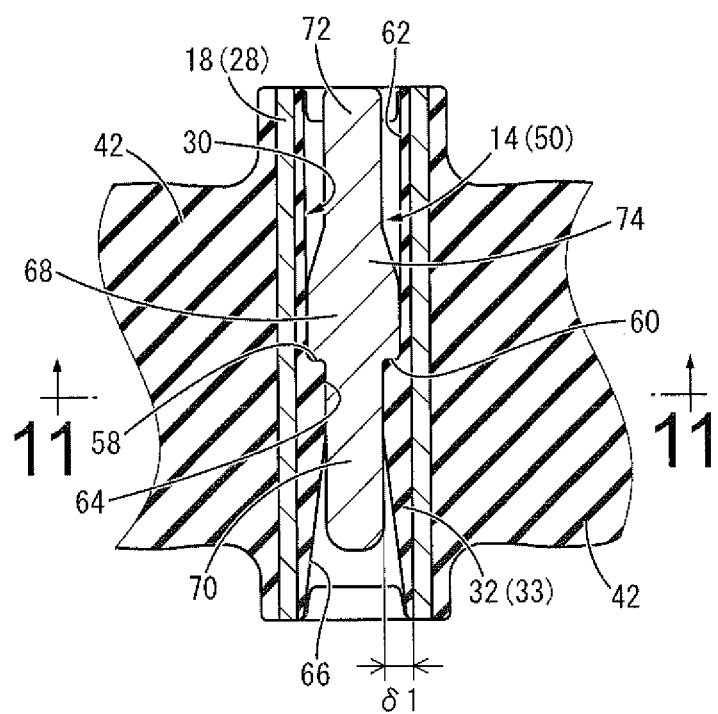
FIG. 13 is an enlarged longitudinal cross section view showing a principle part of the engine mount shown in FIG. 1, taken along line 13-13 of FIG. 11.

As shown in FIG. 13, at the side surface of the engaging projection 50 of the inner bracket 14, the abutted step part 60 is provided at the medial section in the length direction, and a wide part 68 is provided at the first side of the abutted step part 60, and the second side of the abutted step part 60 serves as a narrow part 70 whose width dimension is smaller than that of the wide part 68, the first side and the second side being opposed to each other with the abutted step part 60 interposed therebetween. In other words, on the engaging projection 50, the wide part 68 and the narrow part 70 having a smaller width dimension than the wide part 68 are integrally formed in a serial and continuous manner, and the abutted step part 60 is formed on the connection part of the wide part 68 and the narrow part 70. Furthermore, with this embodiment, the engaging projection 50 integrally includes, at its end part on the side opposite the narrow part 70 sandwiching the wide part 68, the fitted tip part 72 having a narrower width than the wide part 68 and roughly the same width dimension as the narrow part 70. The wide part 68 is provided only at the medial section in the length direction of the engaging projection 50, and the wide part 68 and the fitted tip part 72 are integrally connected via a taper part 74 whose width dimension gradually changes in the length direction.

Then, during mounting of the inner bracket 14 to the first mounting member 18, the engaging projection 50 of the inner bracket 14 is fit into the locking groove 30 from the narrow groove part 64 side with the fitted tip part 72 as the front. Furthermore, after the wide part 68 of the engaging projection 50 is pushed in until it reaches the wide groove part 62 while pushing the narrow groove part 64 of the locking groove 30 wider, by the inner bracket 14 being pulled back to the attachment part 44 side (in FIG. 13, the lower side), the abutted step part 60 of the engaging projection 50 is abutted and locked to the abutting step part 58 of the locking groove 30 in the length direction of the locking groove 30. By so doing, the positioning member that mutually positions and retains the first mounting member 18 and the inner bracket 14 is constituted by locking of the abutting step part 58 and the abutted step part 60, and the connected state of the first mounting member 18 and the inner bracket 14 is made to be stably maintained.

With this embodiment, as shown in FIG. 11 and FIG. 13, the distance: δ1 between opposed surfaces of the side wall inner surface of the projecting part 28 and the side surface of the engaging projection 50 is larger than the distance: δ2 between opposed surfaces of the side wall inner surface of the fitting tube 24 and the side surface of the fitting part 46 (δ1>δ2). Furthermore, the distance: δ1 between opposed surfaces of the side wall inner surface of the projecting part 28 and the side surface of the engaging projection 50 is larger than the distance: δ3 between opposed surfaces of the top and bottom wall inner surfaces of the fitting tube 24 and the top and bottom surfaces of the fitting part 46 (δ1>δ3). With this arrangement, by the inner bracket 14 being pressed against the fitting tube 24, the connected state to the first mounting member 18 is kept, and while the input load support surface area is assured with the fitting tube 24, at the fitted part of the locking groove 30 and the engaging projection 50, the input load burden is made smaller, and the positioning effect by locking is exhibited stably.

Furthermore, the projection tip surface of the engaging projection 50 is abutted on the bottom wall inner surface of the locking groove 30, and the rubber coating layer 32 is compressed vertically between the engaging projection 50 and the projecting part 28. By so doing, even when the projecting part 28 is formed for providing the positioning member on the circumference of the fitting tube 24, a substantial fitting surface area of the first mounting member 18 and the inner bracket 14 can be obtained without becoming smaller, and holding of the connecting by fitting of the first mounting member 18 and the inner bracket 14 is realized with sufficient strength.

With this embodiment, the distance between opposed surfaces of the bottom wall inner surface of the locking groove 30 and the projection tip surface of the engaging projection 50 is roughly the same as the distance: δ3 between opposed surfaces of the top and bottom wall inner surfaces of the fitting tube 24 and the top and bottom surfaces of the fitting part 46. The distance between opposed surfaces of the bottom wall inner surface of the locking groove 30 and the projection tip surface of the engaging projection 50 can be set to be greater than or smaller than δ3, but it is preferable to be smaller than δ1. With this arrangement, the projection tip surface of the engaging projection 50 is sufficiently pressed against the bottom wall inner surface of the locking groove 30, and the pressed surface area of the first mounting member 18 and the inner bracket 14 is assured to be sufficiently large, so the connected state of the inner bracket 14 to the first mounting member 18 is stably held, and the input load support surface area is more efficiently ensured.

Furthermore, by mounting the inner bracket 14 on the first mounting member 18, the projecting part 28 constituting the bound stopper is reinforced by the engaging projection 50 of the inner bracket 14, preventing deformation of the projecting part 28 in relation to the bound stopper load, and improving the load bearing ability.

Also, with this embodiment, the narrow width fitted tip part 72 is provided further to the fitting direction front than the wide part 68 of the engaging projection 50, and the fitted tip part 72 and the wide part 68 are connected via the taper part 74. Therefore, when the engaging projection 50 is fit in from the locking groove 30 narrow groove part 64 side, problems such as fitting work being difficult due to catching and the like are avoided.

Furthermore, on the narrow groove part 64 of the locking groove 30, the taper shaped guide surface 66 is provided on the end part of the side in which the engaging projection 50 is fit, and the groove width dimension gradually becomes larger toward outside in the length direction. By so doing, when fitting the engaging projection 50 in from the locking groove 30 narrow groove part 64 side, the engaging projection 50 is fit in while being guided to the width direction center by the guide surface 66, and the wide part 68 passes the abutting step part 58 and is easily fit in up to the wide groove part 62. In particular, with the end part of the locking groove 30 that constitutes the side wall inner surface with the guide surface 66, the groove width dimension of the locking groove 30 is made to be larger than the width dimension of the fitted tip part 72, and the engaging projection 50 is easily fit into the locking groove 30 without catching on the length direction end surface.

Also, by pulling back the inner bracket 14 after sufficiently pushing it into the first mounting member 18, the abutting step part 58 and the abutted step part 60 are locked, and the inner bracket 14 is easily positioned stably to a designated attachment position with the first mounting member 18. Therefore, compared to positioning member using a fitting structure of a convex part and a concave part or the like, it is possible to stably obtain the target positioning effect, and variation in the relative positions of the first mounting member 18 and the inner bracket 14 is reduced. Thus, a highly precise attachment state is realized.

Also, the wall inner surface of the locking groove 30 is covered by the rubber coating layer 32, and changes in the width dimension of the locking groove 30 or formation of the abutting step part 58 are realized by changes in the thickness dimension of the side wall rubber coating 33 constituting the side wall inner surface of the locking groove 30. Therefore, compared to when changing the cross section shape of the projecting part 28 of the first mounting member 18 in the length direction, it is possible to easily form the wide groove part 62, the narrow groove part 64, the guide surface 66, the abutting step part 58 and the like.

Furthermore, by interposing the rubber coating layer 32 between the projecting part 28 and the engaging projection 50, when fitting the inner bracket 14 into the first mounting member 18, the projecting part 28 and the engaging projection 50 are in direct sliding contact, and the problem of fitting in becoming difficult due to a scratch occurring on the sliding contact surface of the projecting part 28 and the engaging projection 50, or catching occurring or the like are avoided.

Above, we gave a detailed description of an embodiment of the present invention, but the present invention is not limited to those specific descriptions. For example, with this embodiment, we showed an example of a tubular vibration damping device as the vibration damping device of the present invention, but it is also possible to suitably apply the present invention to a bowl shaped vibration damping device. Furthermore, the present invention can also be applied to a fluid-filled vibration damping device.

Also, it is preferable that the projection direction of the projecting part 28 roughly match the main vibration input direction, but it is also possible to project in a direction different from the vibration input direction.

Furthermore, with this embodiment, the stopper was constituted by the projecting part 28 equipped with the locking groove 30 abutting the second mounting member 20, but for example, with a bowl shaped vibration damping device, it is also possible for the projecting part to project facing the side opposite to the second mounting member, and possible for the distance between opposed surfaces of the projecting part and the second mounting member to be set to be sufficiently large to the degree that abutting is not possible. When the projecting part does not constitute the stopper, it is preferable to separately provide a stopper that restricts the relative displacement of the first mounting member and the second mounting member.

Also, the locking part provided on the side wall inner surface of the locking groove 30 can be not only a step such as shown with the embodiment noted above (abutting step part 58), but also a concave or convex part formed on the side wall inner surface of the locking groove 30 or the like. Specifically, a convex part (concave part) can be formed on the side wall rubber coating 33 constituting the side wall inner surface of the locking groove 30, and a corresponding concave part (convex part) can be formed on the side surface of the engaging projection 50, and by the fitting of those convex part and concave part (concave part and convex part), a positioning effect can be exhibited based on the locking effect in the axis direction of the first mounting member.

Also, the locking part can also be provided only on one of the side wall inner surfaces of the locking groove, and in that case, it is possible to provide the step or concave/convex part or the like corresponding to the locking part provided on the engaging projection only on the side surface of the one side.

Furthermore, a plurality of the locking parts can be provided on each side wall inner surface of the locking groove. In specific terms, a plurality of steps or concave/convex parts or the like are provided separated by a designated distance in the length direction of the locking groove, and if those steps or concave/convex parts are respectively made to lock to the side surface of the engaging projection, a more effective positioning effect can be obtained.

Yet further, it is also possible to form a plurality of projecting parts on the circumference of the first mounting member, and to form locking grooves equipped with respective locking parts on those plurality of projecting parts. By so doing, since a plurality of positioning members are constituted, the bracket member is more advantageously positioned to the first mounting member.

Also, the cross section shape of the locking groove is not particularly limited, and with a groove shape equipped with a side wall part and bottom wall part, for example it is possible to have the bottom wall part with the locking groove 30 of the embodiment noted above have a curve downward in a convex semicircle arc shape. It is not absolutely necessary to clearly segment the side wall part and the bottom wall part of the locking groove, and is possible to have the side wall part and the bottom wall part provided smoothly and continuously.

Also, the first mounting member 18 and the fitting tube 24 are not limited to being a square tube shape if tubular, and can also be a polygonal tube shape, a round tube shape or the like.

Also, the first and second bore parts 34 and 38 formed on the main rubber elastic body 22 with the embodiment noted above are not absolutely necessary. Besides, when forming bore parts, there is no particular limit as to their shape, number and formation position and the like, which can be suitably set according to the required vibration characteristics or the like.

With the embodiment noted above, an example was shown with the vibration damping device of the present invention used as an engine mount, but for example, the present invention can also be suitably applied for a body mount, sub-frame mount, differential mount or the like. Also, the present invention can be applied not only to the vibration damping device used for an automobile, but also to the vibration damping device used for example with a motorcycle, a railroad vehicle, an industrial vehicle or the like.

What is claimed is:

1. A vibration damping device comprising:
    a tubular first mounting member having an inner hole used as a fitting hole covered by a rubber coating layer;
    a second mounting member;
    a main rubber elastic body elastically connecting the first and second mounting members; and
    a bracket member fit into the fitting hole of the first mounting member, wherein
    a projecting part is formed partially on a circumference of the first mounting member so as to project toward an outer circumference side,
    a locking groove is formed on the projecting part so as to open onto an inner circumference surface of the first mounting member, and a groove inner surface of the locking groove is covered by the rubber coating layer,
    a locking part is provided on a part of the rubber coating layer that constitutes a side wall inner surface of the locking groove,
    an engaging projection projecting from the bracket member is fit into the locking groove by the bracket member being fit into the first mounting member, and a projection tip surface of the engaging projection is abutted on a bottom wall inner surface of the locking groove, and
    a side surface of the engaging projection is locked to the locking part so as to constitute a positioning member that positions the first mounting member and the bracket member to each other.

2. The vibration damping device according to claim 1, wherein
    the locking part comprises an abutting step part provided at a medial section in a groove length direction of the part of the rubber coating layer that constitutes the side wall inner surface of the locking groove so as to provide a wide groove part on a first side of the abutting step part of the locking groove covered by the rubber coating layer as well as a narrow groove part on a second side of the abutting step part whose width dimension is smaller than that of the wide groove part, the first side and the second side are opposed to each other with the abutting step part interposed therebetween,
    an abutted step part is provided on the side surface of the engaging projection at a medial section in a length direction thereof so as to provide a wide part on a first side of the abutted step part of the engaging projection as well as a narrow part on a second side of the abutted step part whose width dimension is smaller than that of the wide part, the first side and the second side are opposed to each other with the abutted step part interposed therebetween, and
    the engaging projection is fit into the locking groove from a narrow groove part side with a wide part side as a front, and the positioning member is constituted by the abutting step part and the abutted step part being abutted and locked.

3. The vibration damping device according to claim 2, wherein a side wall inner surface of the narrow groove part of the locking groove includes a guide surface that gradually becomes narrower toward the abutting step part.

4. The vibration damping device according to claim 2, wherein the engaging projection includes a fitted tip part that is provided further to a front side than the wide part and has a width dimension smaller than that of the wide part, and the wide part and the fitted tip part are continuously provided via a taper part whose width dimension gradually changes.

5. The vibration damping device according to claim 1, wherein the projecting part projects in a direction of opposition of the first mounting member and the second mounting member, and a stopper that limits relative displacement volume of the first mounting member and the second mounting member is constituted by abutment of a projecting tip of the projecting part and the second mounting member.

* * * * *